(12) United States Patent
Sartori

(10) Patent No.: US 9,988,779 B2
(45) Date of Patent: Jun. 5, 2018

(54) UNMANNED MOBILE DEVICE AND RELATIVE METHOD FOR TREATING A SNOW COVERED SURFACE, AND IN PARTICULAR OF GLACIERS

(71) Applicant: Nausicaa Tilde Sartori, Solferino (IT)

(72) Inventor: Nausicaa Tilde Sartori, Solferino (IT)

(73) Assignee: Nausicaa Tolde SARTORI, Solferino (MN) (IT)

( * ) Notice: Subject to any disclaimer, the term of this patent is extended or adjusted under 35 U.S.C. 154(b) by 0 days. days.

(21) Appl. No.: 14/915,422

(22) PCT Filed: Sep. 2, 2013

(86) PCT No.: PCT/IB2013/001891
§ 371 (c)(1),
(2) Date: Feb. 29, 2016

(87) PCT Pub. No.: WO2015/028835
PCT Pub. Date: Mar. 5, 2015

(65) Prior Publication Data
US 2016/0208450 A1    Jul. 21, 2016

(51) Int. Cl.
  *E01H 4/00*    (2006.01)
  *G05D 1/00*    (2006.01)
  *B60L 11/18*   (2006.01)
  *E01H 5/10*    (2006.01)
  *A01G 15/00*   (2006.01)

(52) U.S. Cl.
  CPC .............. *E01H 4/00* (2013.01); *A01G 15/00* (2013.01); *B60L 11/18* (2013.01); *E01H 5/10* (2013.01); *G05D 1/0011* (2013.01)

(58) Field of Classification Search
  CPC ........... E01H 4/00; E01H 5/10; G05D 1/0011; B60L 11/18; A01G 15/00
  See application file for complete search history.

(56) References Cited

U.S. PATENT DOCUMENTS

| 3,371,586 A * | 3/1968 | Nikolacv ................. E01H 4/00 37/221 |
| 4,767,239 A * | 8/1988 | Erwin ...................... E01H 4/00 37/223 |
| 5,084,992 A   | 2/1992 | Sinykin et al. |

(Continued)

FOREIGN PATENT DOCUMENTS

| AT | 412292       | 12/2004 |
| DE | 2212400 A1   | 9/1973  |
| DE | 20108881     | 7/2002  |

(Continued)

OTHER PUBLICATIONS

International Search Report and Written Opinion for International Application No. PCT/IB2013/001891 (dated May 21, 2014). (8 Pages).

(Continued)

*Primary Examiner* — Anne M Antonucci

(57) ABSTRACT

An unmanned mobile device for treating a snow covered surface having transport means adapted to the movement on snow and/or ice is disclosed. The device has compressing means of the snow for exerting a compression force on the snow in order to increase the specific weight thereof and/or varying means of the temperature of the surface of the snow.

25 Claims, 10 Drawing Sheets

(56) References Cited

U.S. PATENT DOCUMENTS 8,639,416 B2 * 1/2014 Jones .................. A01B 69/007
342/357.22
2002/0116122 A1 8/2002 Satonaka

FOREIGN PATENT DOCUMENTS

| | | |
|---|---|---|
| JP | 4955503 | 5/1974 |
| JP | 61107104 | 7/1986 |
| JP | 04183318 | 6/1992 |
| WO | 2011135394 A1 | 11/2011 |

OTHER PUBLICATIONS

Notice of Reasons for Refusal dated Jul. 25, 2017 for corresponding JP application No. 2016-537391.
Office Action dated Jan. 13, 2017 for corresponding European application No. 13789039.8.
Office Action dated Nov. 3, 2017 for corresponding European application No. 13789039.8.

* cited by examiner

UNMANNED MOBILE DEVICE AND RELATIVE METHOD FOR TREATING A SNOW COVERED SURFACE, AND IN PARTICULAR OF GLACIERS

CROSS-REFERENCE TO RELATED APPLICATIONS

This application is a 371 of PCT/IB2013/001891, filed Sep. 2, 2013.

FIELD OF THE INVENTION

The present invention relates to an unmanned mobile device, adapted to operate on the snow and in particular on a glacier, or snowpack.

It has to be noted immediately that herein and in the following the term "unmanned" relates to the lack of an operator directly placed on the mobile device, and comprises therefore devices that are able to be moved autonomously by virtue of an inner software, or which are able to receive controls by a software or a remote operator.

In particular, the present device is used for the treatment of a snow-covered surface. With such a term it is meant that the device, the system and method according to the present invention can be used for the surface treatment of any glacier or snowpack and thus of the snow settled on any surface. The present invention is particularly used for the treatment of snow-covered surfaces and in particular of glaciers. Although in the following reference will be made specially to the preservation of glaciers, the device, the system and the method according to the present invention can be obviously used for the treatment of other snow covered surfaces such as for example ski slopes, trails and the like.

As it is known, the glaciers represent an essential water resource for mankind.

On the mountain ranges, the precipitated snow is partly melted during the summer season, whereas the remaining portion settles on layers precipitated in the previous years, causing the formation of a glacier.

The iteration of such a process during years determines the gradual compression of lower layers in the glacier, to form ice layers characterized by low content of air encapsulated among the micro-crystals composing the ice itself. Such a low air content is due, in addition to the compression, also to the snow melting during summer. In fact, the water that is created upon the melting of a surface layer of snow penetrates into the underlying layer of snow and re-freezes during the following cold phase, filling all air gaps, which are therefore eliminated due to the air ejection.

In a thaw-freeze cycle with compression, the ice of lower layers gains a very high specific weight and a high thermal lag per unit volume.

In these conditions, a cubic meter of ice of the lower layers can contain 800 liters of water, and this means that, at the same weather conditions, a cubic meter of such an ice melts in a time period even up to eight times the time needed for the melting of a cubic meter of fresh snow. It becomes therefore evident that the ice of the lower layers of a glacier is a very important thermal source on mountain ranges, needed for preserving the current water resources.

However, most of the snow precipitated on glaciers is removed by the wind. The fresh snow has in fact a very fine grain size and has a very large amount of air with respect to the number of water molecules contained in the unit volume, and therefore straggles easily. In general, the snow swept by the wind accumulates on steep slopes until causing avalanches of various extent which, falling downstream, reach a height low enough whereby the snow is melted during the summer season.

A number of scientific studies detected that, recently, the amount of snow which precipitates yearly on a glacier is totally melted, causing in addition to the total melting of the precipitated snow, the gradual involvement of lower layers of ice too in the fusion process. Such a phenomenon caused the loss of millions of cubic meters of ice in the Alpine region.

The lasting of such a condition could determine the whole disappearing of perennial glaciers determining evident ruinous consequences on plant and animal kingdom.

It is therefore felt the urgency of effective methods for the preservation of glaciers.

KNOWN PREVIOUS ART

In order to preserve the glaciers the technique of covering their surface with plies preventing the sunrays from penetrating and melting the fresh snow during the summer season, is known. The plies are laid out with the help of vehicles such as snowcats and then heat sealed to proper supports. The reverse operation of ply recovery is carried out at the end of the summer season and repeated every year so that to allow the snow buildup during winter months. Such a method requires a large employ of skilled labor, besides the use of specific materials, with consequential very high costs.

Furthermore, such a method can partially counteract the melting action during the warmest months under the action of the sun, but does not prevent the erosion effect of the wind during winter months when, in absence of such plies, the settled snow is swept without the possibility of effectively being made integral with the glacier substrate. Object of the present invention is to solve the known art problems, and in particular the treatment of snow covered surfaces, such as for example the preservation of glaciers by means of a device and an effective and automated method, which does not require the worker employ which, because of the environmental conditions present on glaciers in winter months, would become dangerous as well as too much burdensome.

It has to be noted that the present project is not alternative to the use of protective plies, but can be supplementarily used on glacier during the winter season. In fact, while it is useful protecting the glacier during summer, it is also true that the ply is not able to generate ice during winter. Therefore, the integration of the use of protective plies in summer and of mobile devices in winter will lead to optimal results in terms of glacier thickening.

SUMMARY OF THE INVENTION

These and further objects are reached by the present invention by means of an unmanned mobile device for the treatment of a snow covered surface, and in particular for the preservation of a glacier, comprising transport means adapted to the movement on snow and/or ice. The device is characterized by comprising means for compressing the snow adapted to exert a compression force on the snow to increase its specific weight and/or means for varying the temperature of the snow surface on which the mobile device is moved.

In other words, the mobile device according to the present invention can be provided with means for exerting a compression force on the snow surface, in combination with, or alternatively to, means for varying the temperature of the snow surface.

It has to be noted that the compression force exerted on the snow determines the compaction thereof thereby increasing the specific weight, and therefore the density thereof, thus taking a form more similar to ice.

According to an aspect of the invention, the means for varying the temperature of the snow surface comprise means for heating and/or cooling the snow surface, in other words, they can be adapted to increase the temperature of the snow surface or adapted to lower the temperature of the snow surface.

As it will be better seen in the following, according to a preferred embodiment, the combined action of snow compression through the compressing means of the device and heating of the snow surface through proper heating means allows to effectively compact the snow by making it adhere to the glacier substrate.

According to a further aspect of the invention, preferably the cooling of the snow surface occurs independently from the compression action.

Furthermore, it has to be taken into account that the independent action of snow heating, preferably during winter months, and the independent action of snow cooling, preferably during summer months, allows to reach the object of the present invention, that is to say the treatment of snow covered surfaces, especially those of glaciers for their conservation. It has to be noted that the heating action of the snow surface, according to an aspect of the present invention, does not determine the melting thereof but causes the heating of the air encapsulated among the crystals causing the ejection thereof, since the expanding warm air breaks the crystal bonds (which are much weaker than the bonds among water molecules). Once the bonds are broken, the warm air, with a higher volume than the surrounding air, is ejected allowing the snow compaction.

It has to be noted that the means for compressing the snow adapted to exert a force, generally in a direction substantially perpendicular to the movement direction of said device, and the means for varying the temperature of the snow surface on which the mobile device is moved, can be present at the same time on the device and can be used in combination or independently from each other, or can be alternatively installed thereon.

As mentioned, the device according to the present invention is able to autonomously move inside a certain perimeter of a glacier and through the compressing means exerts on the snow surface a force preferably in a direction substantially perpendicular to the direction of movement of the device. In other words, during the movement of the mobile device on the snow surface, preferably along a predetermined path, the compressing means exert a force, preferably downwards, able to press the snow such as to compact it thereby increasing the specific weight thereof and making it integral with the glacier substrate.

As better explained in the following, by virtue of such a compression, the surface layer of the snowpack can be compacted artificially, increasing the specific weight thereof and making it therefore more similar to ice, so that to render it more resistant to the erosive action of the wind. More in detail, the precipitate snow is made integral with the lower substrate through the mechanical compression exerted by the mobile device. The snow increases its specific weight thereby losing the flake consistence, in which phase the snow contains a lot of air and therefore could be easily transported by the wind, the snow being very bulky with respect to its mass.

The mobile device according to the present invention is furthermore unmanned, in the above specified meaning, that is to say that it does not provide for the presence of an operator thereon. This allows the device to autonomously work in adverse weather conditions and for very long periods of time.

As mentioned, according to a preferred aspect of the invention, the device comprises means for varying the snow temperature, and in particular means for heating (the surface of) the snow.

By providing thermal energy to the surface of the snow, preferably, the microscopically formation of new microcrystals, substantially coplanar one to another, is induced during the compression obtaining the formation of a crust on the upper surface of the snow, which allows to further increase the resistance against the wind erosion. In any case, the energy provided is such to not vary the thermodynamic state of snow layers.

According to a further possible embodiment, the mobile device according to the invention comprises means for cooling the snow surface. Such means are preferably used during the summer season such as to keep low the snow temperature, slowing down the melting thereof.

According to an aspect of the present invention, the compressing means are mobile between at least one non-operating position, in which they are raised from the snow surface, and at least one operating position in which the compressing means are contacting the snow surface to exert a compression force thereon. In this manner, during the movement of the mobile device the compressing means will be arranged in operative condition contacting the snow to compress it, whereas when the mobile device is moved towards a service station, the compressing means will be placed in non-operating condition, that is to say not contacting the snow surface, so that to increase the speed of the device and thus decrease the time required to come back to the service station.

Advantageously, the force exerted by the compressing means of the device can be varied according to the snow conditions, during the movement of the mobile device. Preferably, the variation of the compression force during the movement is carried out as a function of the temperature of the snow surface.

According to a preferred embodiment, the compressing means comprise at least one thrust surface that is arranged so that to result substantially parallel to the snow surface on which the compression force has to be exerted. Advantageously, the compressing means exert a compression force on the snow per unit surface higher than 1500 Pa, preferably equal to 2000 Pa.

According to an advantageous aspect of the present invention, the at least one mobile device is automatically moved, preferably according to a predetermined path, so that the compression operations of the snow surface can be automatically carried out. For this purpose, the device according to the present invention comprises means for identifying the position of the mobile device itself, such as for example GPS sensors, radio wave emitters and/or receivers, accelerometers, or a combination of two or more of said means for identifying the position.

Furthermore, according to an aspect of the present invention, the mobile device comprises at least one sensor for the detection of the environmental conditions surrounding the same. The at least one sensor is selected from thermometers, anemometers, optical sensors (cameras), distance sensors. It has to be noted that, according to possible embodiments, the mobile device can comprise a combination of said sensors.

It has to be noted as well that the mobile device according to the present invention comprises means for transmitting and/or receiving data so that the device can be remotely controlled, preferably by means of a wireless connection. The data transmitted and/or received by the mobile device can concern the path to be followed on the glacier surface, and thus control data for the movement means, or else data relating to means for identifying the position and/or sensors for determining the environmental conditions wherein the mobile device operates. Furthermore, the data can be related to the residual uptime of the mobile device, or related to the correct operation of the mechanical and electronic parts of the mobile device 1.

According to a preferred aspect of the present invention the at least one mobile device cooperates with at least one, preferably fixed, service station which allows the shelter of the mobile device in case of adverse weather conditions, as well as allowing the power supply of the mobile device needed for the its operation. In particular, the service station allows the recharge of batteries or fuel cells, in case the mobile device is powered by at least one electric motor.

In other words, the at least one service station comprises means for providing electric power to said at least one mobile device.

According to an aspect of the present invention, the at least one service station comprises means for transmitting data towards and/or receiving data from said at least one mobile device. Advantageously, the means for transmitting/receiving data of the service station from/to the mobile device and the means for transmitting/receiving data of the mobile device from/to the service station cooperate so that to establish a connection between them, preferably by means of a wireless type connection.

Furthermore, the at least one service station allows the shelter, especially in case of adverse weather conditions or during the power supply, of at least one mobile device. In this regard, it comprises means for substantially stably retaining at least one mobile device. With the expression "substantially stably retain" the impossibility is meant of moving away the at least one mobile device from the service station without operating the retaining means of the service station to release the mobile device.

According to an aspect of the present invention, the at least one service station comprises means for varying its own height, so that it can fit with the soil height increase due to the snow fall during winter. By varying its own height, for example by means of two or more telescopically movable parts or with a worm, the at least one service station can always be reachable by the at least one mobile device even if the settled snow increases in height.

The present invention relates as well to a system comprising at least one mobile device and at least one service station intended to cooperate with at least one mobile device. Advantageously the presence of a plurality of cooperating mobile devices with respective service stations allows to increase the glacier surface which is compressed and/or treated to vary the temperature thereof, preferably cooling it in warm months and heating it in cold months, upon the movement of the mobile devices thereon, so as to render faster the snow compression process, which in the following will be also called glacification process, making the covering of a larger surface possible. According to an aspect of the invention, the snow compressed by the mobile device will have small vertical protrusions, which are able to intercept the snow falling obliquely (in slang "wind blown" snow), preventing it from settling in areas called ravines in slang, from where probably it slides downstream for excessive buildup. In this regard, the mobile device according to the invention is provided with means for varying the snow surface generating a plurality of vertical protrusions. Preferably, such means are integrated in the compressing means of the mobile device.

The number of mobile devices and service stations adapted to cooperate therewith, preferably a service station for each mobile device, can sensibly vary according to the needs of use and can also reach the employ of hundreds of mobile devices.

The present invention relates as well to a method for treating a snow covered surface, and in particular for preserving a glacier, by means of the use of at least one mobile device of the above described type, comprising the step of moving the at least one mobile device on the snow surface to exert a compression force thereon and/or the step of moving said at least one mobile device on the snow surface to vary the snow surface temperature, so that to prevent or hamper the wind erosion on said glacier.

Preferably, the mobile device is moved along a predetermined path, which is preferably constituted by lines substantially parallel to the contour-level lines, to allow the movement means of the mobile device to have better efficiency.

As said above, the movement of the at least one mobile device is controlled by at least one service station which is connected thereto so that to offer a remote control of the mobile device, so as to carry out the operations of compression of the snow surface automatically and without the need of an operator.

It has to be noted as well that the mobile device according to the present invention, and the relative method of use, allow to preserve the glaciers by compressing the fresh snow settled in winter months, simply and effectively as well as particularly inexpensively and environment friendly. In fact, the automated movement of mobile devices having relatively reduced dimensions on the glacier surface, preferably supplied by electric power from renewable source, has not negative effects in terms of environmental impact and environment-sustainability on the glacier on which they operate.

Furthermore, it has to be noted that the movement of the at least one mobile device can be advantageously used for varying the snow surface temperature independently from, or in combination with, the snow compression. According to an advantageous aspect of the present invention, the heating of the snow surface is preferably used in combination with its compression, whereas the cooling of the snow surface is preferably carried out independently from its compression, preferably during warm months.

BRIEF DESCRIPTION OF THE FIGURES

These and other advantages will be evident from the following description and figures in attachment, herein reported for illustrative and not limitative purposes, wherein.

DETAILED DESCRIPTION OF SOME EMBODIMENTS OF THE PRESENT INVENTION

Figure 1:
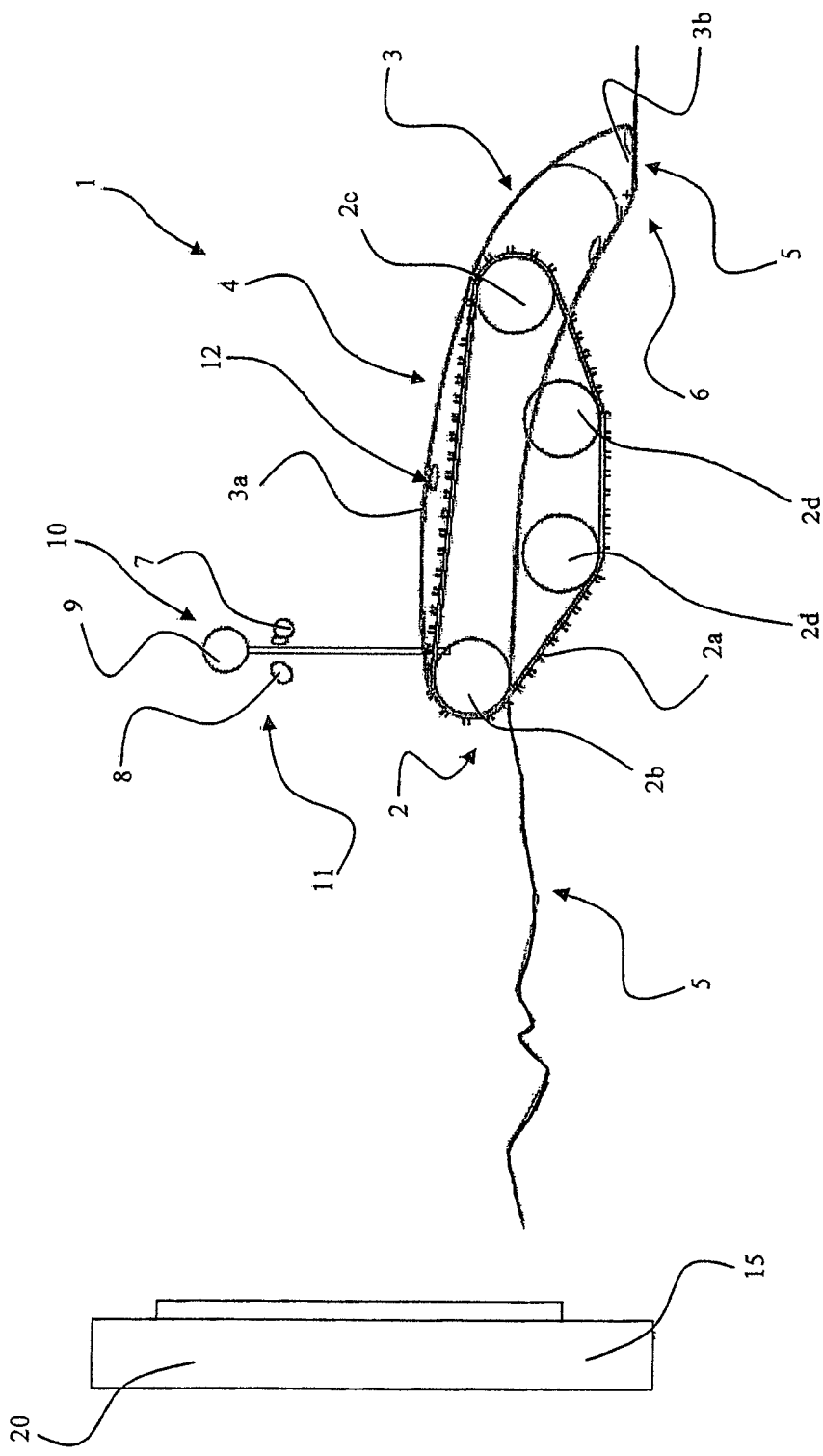
FIG. 1 shows a side view of a possible embodiment of the mobile device and the service station according to the present invention.

Referring to the attached figures it will be described a possible embodiment of the unmanned mobile device 1 for treating a snow covered surface and in particular for preserving a glacier, hereinafter also simply called device 1 which, as it will be better seen in the following, comprises transport means 2, means for compressing the snow 3 and/or means for varying the snow surface temperature (5).

It has to be noted immediately that with the expression snow surface temperature variation, the snow layer is meant, starting from the upper surface that is involved by the temperature variation, preferably carried out acting on its surface.

The transport means 2 are generic means allowing the movement on glacier surfaces, and therefore in particular snow and ice. According to a preferred embodiment shown in figures, the transport means comprise at least one track. However the use of alternative transport means is not excluded, for example some gear wheels could be used instead of tracked transport means.

Referring to the embodiment shown in figures, the tracked transport means 2 have aluminium teeth 2a, a pinion 2b acting as a drive member, a wheel 2c opposed to the drive member 2b to assure the correct tensioning of the track, and two supporting wheels 2d. It is however evident that different conformations of the track, known in the art, fall within the object and the protection scope required for the present invention.

In general, the transport means 2 allow the movement of the mobile device along a glacier at least along one motion direction M. In particular, the variation of the advance direction can be carried out by selectively controlling, as known, the two tracks the device 1 is provided with. Despite this, it has not to be excluded that according to further embodiments different means are used to determine the variation of the forward direction of the mobile device.

According to a possible embodiment the transport means comprise at least one electric motor 2e, and preferably the developed mechanical power is equal to 1500 Watt as a breakaway value, and 1200 W uphill. The herein reported values have to be intended as not limitative, in fact, according to further possible embodiments the mobile device can be provided with motors having different characteristics.

According to a possible embodiment, the device comprises at least two motors, one for each track, or four motors positioned in pairs under each track.

The at least one electric motor 2e is powered by means of at least one battery 2f (see FIG. 1A) which, as it will be better seen in the following, is recharged by means of a service station 15 to which the at least one vehicle is periodically connected.

Preferably the at least one battery, being a heavy component, is placed along the symmetry axis of the mobile device 1.

It has to be noted as well that according to further possible embodiments, the mobile device 1 can be powered by at least one fuel cell, not shown in the attached figures. The use of this technology, known in the art, is particularly advantageous in terms of both economical and environmental impacts, as well as for the fact that the water notoriously produced by the fuel cell can be let flow on the snow surface to improve the compactness thereof upon the glacification.

Figure 1A:
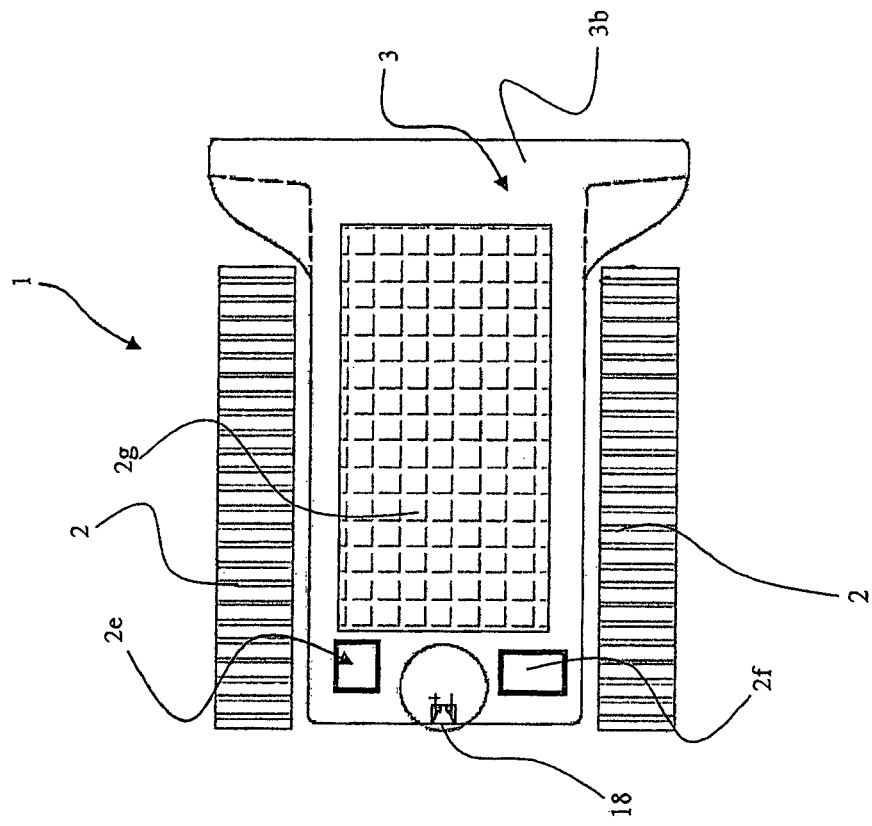
FIG. 1A shows a top view of the mobile device and the service station according to the present invention.
Figure 1A:
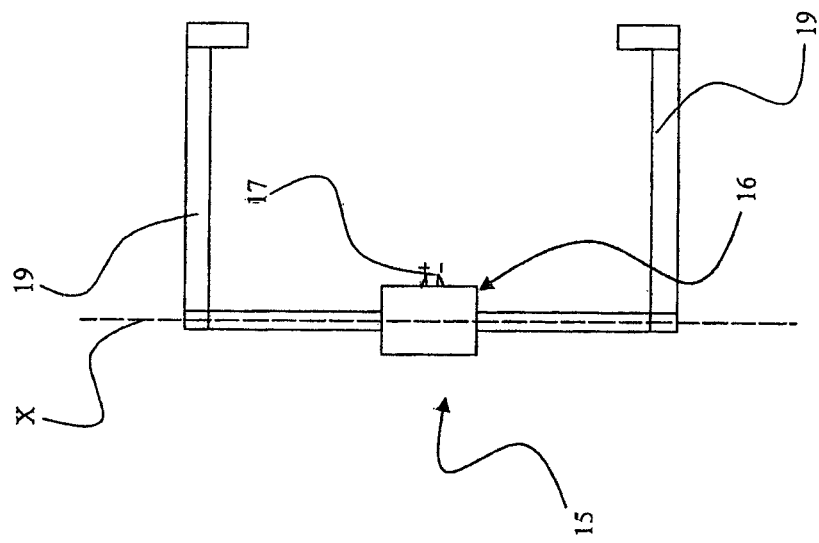

Furthermore, it has to be noted that at least one photovoltaic panel 2g, see in particular the top view of FIG. 1A, can be arranged on the surface of the mobile device 1 in order to assure an additional power source for its moving.

Despite having explicitly referred to movement means 2 comprising at least one electric motor, it is not excluded that the propulsion of the device 1 can occur with other means known in the art such as for example a conventional or innovative motor, such as for example a hydrogen motor. In such a case, part of the power developed by the conventional motor would be converted by appropriate means in electric power to feed the electric consumptions of the device 1 itself.

According to methods known in the art, the transport means 2 preferably allow the movement of the device 1 along slopes with a maximum inclination of 50°.

In this manner, the mobile device will be able to operate on most of the existing sweeps of glaciers and at the same time could work in situations far from the limit conditions that could easily generate technical problems to the operation of the device 1.

As mentioned, the mobile device 1 comprises compressing means 3 of the snow, adapted to exert a compression force thereon, which are preferably separated, that is to say do not coincide with the movement means 2 of the device.

According to an aspect of the invention, the compressing means 3 of the mobile device 1, are adapted to exert a force F on the snow to determine its increase of specific weight, preferably in a direction D substantially perpendicular to the direction of movement M of the device 1.

In this manner, the surface of the glacier on which the device 1 is moved, and in particular the surface of the settled snow, can be advantageously compacted, with the subsequent increase of the specific weight and therefore of the density, by means of the compression force exerted by the mobile device 1, so as to be rendered integral with the glacier substrate.

In other words, the compressing means 3 of the mobile device 1 exert a substantially downwards force F, on the surface of the snow 5, able to compact it.

In an embodiment, such compressing means comprise at least one thrust surface 3b, preferably made of metal, which in the embodiment shown is advantageously made of aluminium, so that to be light and resistant at the same time. The at least one thrust surface 3b in operative condition is arranged substantially parallel to the direction of movement M of the device 1, that is to say substantially parallel to the surface of snow 5 on which the compression force has to be applied. In this manner, a substantially uniform compression force can be exerted on the snow 5 preferably in the above described direction. Concerning this see the top view of FIG. 1A and FIG. 6.

According to an aspect of the present invention, the compressing means 3 are preferably movable.

More in detail, the compressing means 3 are movable between at least one non-operating position wherein said compressing means are raised from the surface of the snow 5 and at least one operating position wherein the compressing means 3 are contacting the snow surface to exert a compression force thereon.

Despite this, it has to be taken into account that according to possible further embodiments, the compressing means 3 can be fixed and retained in operating position in contact with the snow 5.

It has to be noted as well that according to a possible embodiment, the compression force F exerted by the compressing means 3 on the snow can be varied during the movement of the mobile device, for example as a function of the snow temperature.

For this reason, the mobile device 1 can be provided with at least one snow temperature sensor, not shown in the attached figures. Based on data detected by said sensor, the compressing means 3 can be advantageously operated to vary the exerted force.

Preferably, the device 1 has a main body 4 to which the transport means 2 are constrained and compressing means 3 which, as mentioned above, are movable with respect to the main body of the mobile device 1.

Of course, different movement typologies of compressing means with respect to the main body of the device 1 can be used, such as for example a rotation movement with respect to an axis or a translation movement.

According to a possible embodiment, and such as shown in the figures, the compressing means 3 are rotatably sliding with respect to the main body 4. In other words, the movement of the compressing means 3 between the operating and the non-operating position, and vice versa, occurs through a roto-translation movement of the compressing means, and in particular of the at least one thrust surface 3b with respect to the main body 4 of the mobile device 4.

Figure 2:
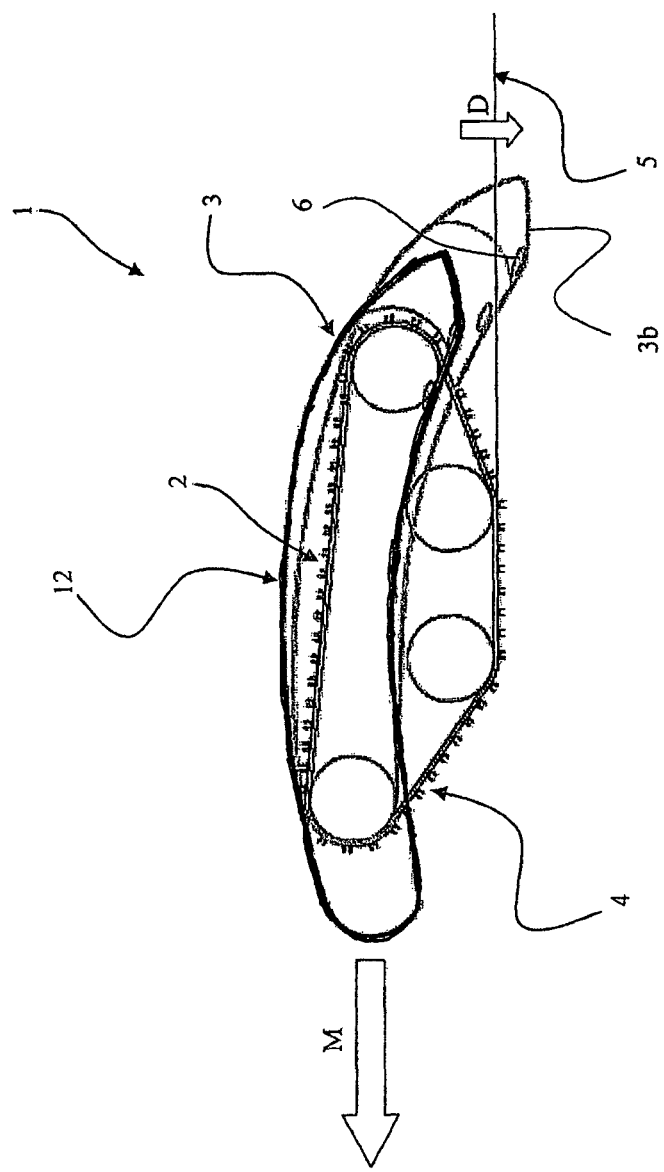
FIG. 2 shows in a side view the operating position and the non-operating position of the compressing means of the mobile device according to the present invention.

More in detail, the at least one thrust surface 3b is placed at the end of an element 3a, which preferably has plant dimensions substantially equivalent to the plant dimensions of the main body 4 of the device 1 without the tracks, and is movable between an non-operating position (shown in FIG. 7), in which the thrust surface 3b is disengaged with respect to the snow surface, and an operating position (shown in FIG. 6), in which the thrust surface 3b is engaged with and can exert a pressure on the surface of the snow 5. FIG. 2 shows the compressing means 3 in the operating position, shown by means of a lighter solid line, and the non-operating position shown by means of a darker solid line.

In general, the compressing means 3 are able to exert a force on the snow 5 per surface unit of about 1500 Pa, and preferably of about 2000 Pa.

The application of such a force occurs according to methods known in the art, for example through a hydraulic, pneumatic, electrical system, or more easily due to the weight of the compressing means 3 and/or due to the weight of the mobile device itself, or by means of the combination of one or more of the solutions herein indicated for example purpose.

In the embodiment shown in the attached figures, the displacement of the compressing means 3 from the non-operating position to the operating position determines a raising of the front part of the mobile device 1 so that the weight of the device itself is displaced rearward at the thrust surface 3b. In other words, according to an embodiment, the weight of the mobile device 1 contributes to the generation of the compression force exerted by the compressing means placed in operating position in contact with the snow surface.

It has to be noted that according to a possible embodiment, and such as shown in attached figures, the compressing means 3 and in particular the thrust surface 3b exert a compression force F on the snow placed at the rear part of the mobile device 1. In other words, the thrust surface 3b is preferably placed on the mobile device 1 at the rear part of the same during the forward movement.

According to an aspect of the present invention, the mobile device 1 comprises means 6 for varying the temperature of the surface of the snow 5. As mentioned above, the means 6 for varying the temperature can be provided independently or in combination with the compressing means 3 of the mobile device 1.

Furthermore, the means 6 for varying the temperature can be present concurrently on the mobile device 1 or be made to be interchangeably installed on the mobile device 1.

According to different possible embodiments, the means 6 for varying the temperature of the snow surface comprise means for heating and/or cooling the surface of the snow 5. In other words, the heating means can be used in combination with or alternatively to the means for cooling the snow.

The means 6 for varying the snow temperature are selected from components known in the art able to provide heat to the snow or to subtract heat from the snow. According to a possible embodiment, as shown in the figures; the means 6 for heating the snow comprise one or more electrical resistances.

Figure 6:
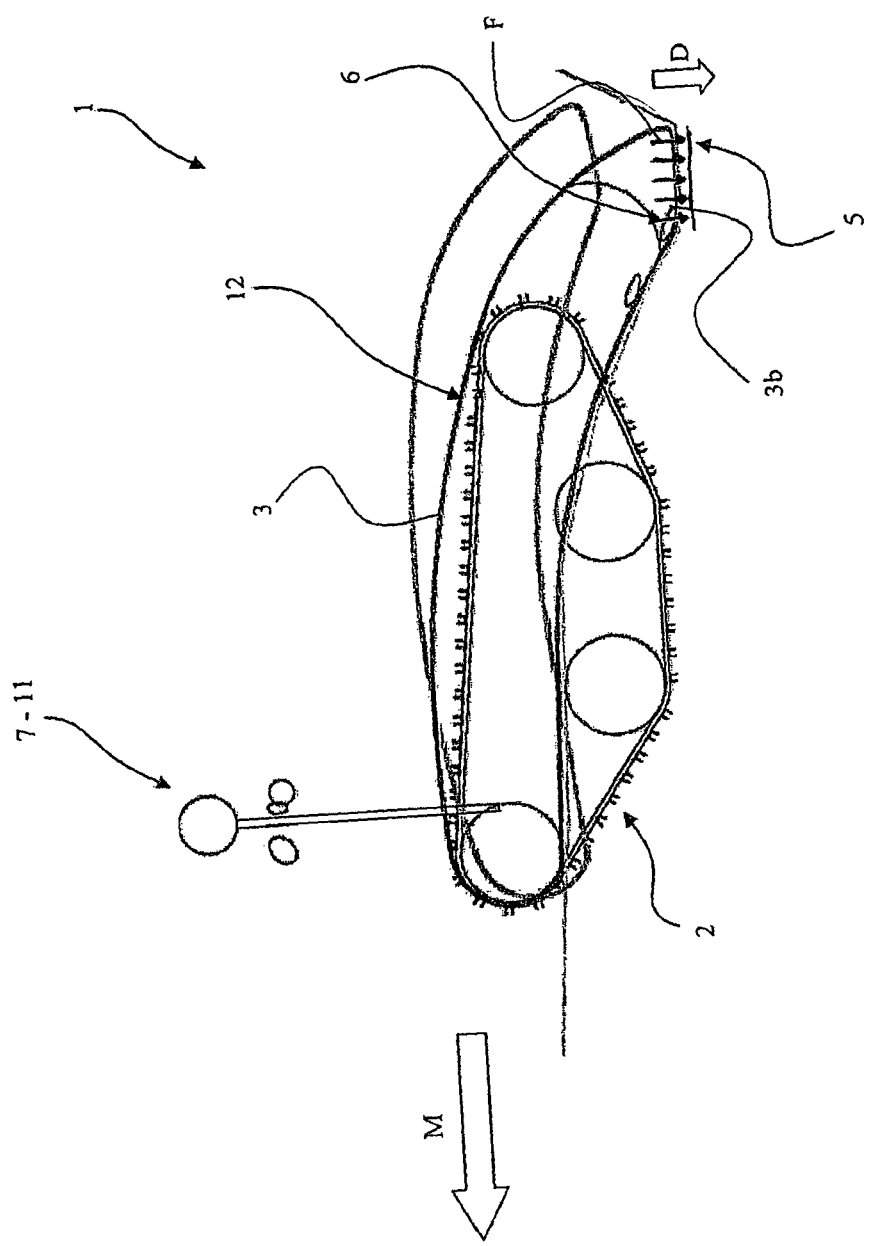
FIG. 6 is a side view of the mobile device according to the present invention in which the compressing means are operated to reach the operating position contacting the snow surface.

Such heating means 6 are arranged so that to be able to heat at least the surface of the snow 5 placed on the glacier surface on which the mobile device 1 is operating. As shown in FIGS. 1 and 6, the means 6 are preferably placed at, or at least in proximity of, the thrust surface 3b.

The heating action carried out on the surface of snow 5, allows to obtain an advantageous arrangement of the ice micro-crystals within the snow 5 for obtaining an effective compression and compaction of the snow surface.

According to a possible embodiment, on the other hand, the means for cooling the snow, not shown in figures, comprise at least one carbon dioxide compressor and at least one evaporator arranged on the ending part of the mobile device 1 so as to cool the snow surface reducing its temperature during summer months.

The effect of such a work will be to shorten the summer season of the glacier and therefore reduce the melting time of the glacier.

Of course, other means known in the art and usable to cool the snow surface can be employed.

As already mentioned, the means for heating the snow are preferably used in combination with the compressing means 3.

Despite this, according to possible embodiments, the mobile device 1 can be provided with heating means 6 and without compressing means 3, or else the two compression and heating actions can be carried out separately, despite the mobile device 1 being provided with both the compressing means 3 and the means 6 for varying the temperature.

It has to be noted that the means for cooling the snow surface too can be provided in combination, or alternatively, with the means for heating the snow, and provided in combination, or alternatives, with the compressing means 3 on the mobile device 1. According to an aspect of the present invention, the mobile device 1 is provided with identifying means 30 of the position of the device on the glacier. Different means for identifying the position known in the art can be used on the mobile device 1. For example, the device 1 can be provided with GPS receiver for the communication with the satellite network orbiting around the earth. Alternatively or concurrently, the positioning of the mobile device 1 can be carried out by using the earth radio stations, from and towards which the mobile device is able to receive/transmit radio waves. The time elapsed between the sending of a query signal and the receiving of a response signal between the mobile device 1 and several radio stations allows to identify the position of the device itself. Alternatively, or in addition, the mobile device can be provided with accelerometers, which record the accelerations to which the mobile device 1 is subjected. Thus the system, by knowing the starting position of the device and the constant value of the earth gravitational acceleration, can therefore integrate the motion equations of the device to trace the position thereof. Such a method, while allowing a complete autonomy of the device, is less accurate than the above proposed methods, and needs to know the starting position of the device since the accelerometers are operated.

Furthermore, the device is preferably provided with sensors able to detect data related to the device 1 and/or the environment surrounding the same. In the shown embodiment, for example at least one temperature sensor 7, at least one optical detection system (such as for example a web cam or a camera) 8, at least one anemometer 9 and at least one distance sensor 10, and data transmitting/receiving means, typically comprising at least one antenna 11, are present. For the sake of convenience, hereinafter the antenna 11 will be referred to as a generic element for transmitting/receiving data, although it will be evident that an additional device could be used with the present invention as data transmitting/receiving means 11, without for this reason departing from the object of the present invention.

In detail, the temperature sensors 7, optical detecting sensors 8 and the anemometer 9 allow to determine the atmospheric conditions in which the mobile device operates. In case of adverse conditions, also indicated as emergency conditions in the following, that is to say in case the data detected by the sensors 7-10 exceed the predetermined threshold values, the mobile device 1 will be brought back to a safe place, and preferably to a service station 15 which will be described more in detail in the following.

It has to be noted that in the attached figures the sensors 7-10 and the transmitting/receiving means 11 are illustrated as arranged at an appendage of the mobile device 1, however they can be of course integrated in the body 4 thereof.

Advantageously the at least one distance sensor 10 of the device 1, for example for the measurement of horizontal and/or vertical distance, allows to detect the presence of obstacles along the path of the mobile device 1. For example, the sensor 10 of vertical distance can be used to detect the presence of a crevasse along the path of the mobile device. In these cases, the path of the mobile device will be modified.

According to an aspect of the invention, the mobile device is further provided with removing means 12 for the removal of the ice from the surfaces thereof.

Different means adapted to the object are known in the art, for example the embodiment shown in figures is provided with at least one electrical resistance 12 for the ice removal. The position of the resistance 12 is only indicative, since several resistances can actually be used on the device 1 and positioned in positions most sensitive to the ice formation.

Other means for the ice removal are known in the art, for example means for conveying forced warm air, means for the pneumatic inflation of bags adapted to break the ice etc., which can be equally used in the present invention on the device 1.

According to an aspect of the invention, the mobile device is further provided with a controller or CPU 13.

The CPU 13 controls the various operations of the mobile device, among which the processing of received data and the control of sensors 7-10 and by the antenna 11, the control of the movement of the device 1, the control of the means for removing the ice 12, etc.

In particular, the CPU can be used to autonomously control the movement of the device and/or to carry out the device movement controls received from the outside.

According to a preferred aspect of the invention, the mobile device 1 is able to cooperate with at least one service station 15.

A service station 15 is schematically shown in FIGS. 1, 1A, 3, 4, 8 and 9. Typically, the service station is fixed and comprises an elongated base body, to which different components can be constrained adapted to interface with the mobile device 1.

As mentioned above, the at least one fixed station can comprise means for varying its own height, which are not shown in the attached figures, so that to advantageously allow the correct supply and the protection of at least one mobile device independently from the height of the fallen snow.

According to a first aspect, the service station 15 is provided with means 16 for supplying power to the mobile device.

In the embodiment shown, wherein the device 1 is electrically supplied, the station 15 is connected in a known way to the electric network or a generator, and has contacts 17 (see FIG. 1A) adapted to cooperate with relative contacts 18 of the mobile device 1, so that to transfer electric power from the first one to the second one, so that to recharge the battery of the mobile device 1.

Preferably, the service station 15 is provided with means 19 for retaining the mobile device in a substantially stably position, so that to effectively recharge for example the device 1 and protect the same in case of adverse weather conditions, such as for example in case of strong wind bursts. According to a possible embodiment, and as shown in FIGS. 1A, 3, 4, 8 and 9 the means 19 for retaining in a stably position at least one mobile device 1 comprise at least one mobile arm. Each arm is movable between at least one engaging position with the mobile device (shown in FIGS. 3 and 9), in which the latter is effectively retained in proximity of the service station 15, and a disengaging position therefrom (shown in FIG. 4) in which the device can be moved and can move away from the service station 15.

In the embodiment shown in figures, the means 19 for retaining at least one mobile device 1 comprise at least one arm rotatable around an axis X substantially horizontal (see for example FIG. 4), so that the at least one mobile arm 19 can be raised and lowered upon its rotation around the axis X.

According to a possible embodiment, the means for retaining the at least one mobile device, and in particular the at least one arm 19, can vary their length so that at least one mobile device can be retained independently from the height of the fallen snow. According to a possible embodiment the at least one arm 19 is telescopic so that to vary its own length.

Furthermore, the service station 15 can be provided with data transmitting/receiving means 20. Such means can be used for example for receiving data provided by the sensors 7-10 of the device 1; for transmitting data and/or controls to the device 1, etc. Furthermore, the station 15 can communicate through the transmitting means 20 with a central control station, remotely arranged with respect to the glacier on which the at least one station 15 and the at least one mobile device 1 are arranged for operations. Furthermore, also the service station 15 can be provided with a CPU, in order to process the controls to be sent to the mobile device 1, besides controlling the various instruments of the station itself, among which the mentioned means 16 for the power transmission, the retaining means 19, the data transmitting means 20, etc.

Advantageously at least one mobile device 1 is continuously connected for receiving/sending data relative to the movement path, and/or data detected by the sensors 7-10 of the mobile device such as for example the images detected by the optical detecting sensor, the outside temperature, the pressure exerted on the snow, wind speed, snow temperature before the compression and after the compression.

In other words, the means 20 for transmitting and/or receiving the data of the at least one service station 15 are connected through a wireless connection to the means for transmitting and/or receiving the data 11 of the at least one mobile device 1.

In this manner, advantageously the mobile device 1 could be remotely controlled by the service station 15, preferably through a software; however, the mobile device 1 has a homed embedded software, in case the wireless connection would be lost.

According to an aspect of the present invention, the at least one service station 15 is connected through a wireless connection to a control station placed at some kilometers at the maximum, which in its turn can be connected to a remote operative center. The software placed in the at least one service station 15 could be manually modified by the remote office. Furthermore, each mobile device 1 could be driven too by the remote operative center, if needed.

According to a preferred embodiment from the energetic point of view, each service station 15 is independent and comprises means for producing power preferably of wind or photovoltaic type. Despite this, according to further possible embodiments the at least one service station 15 can be supplied with conventional power, for example through a fuel generator.

According to a possible embodiment, the Applicant hypothesized that, in order to assure the correct operation of a mobile device 1, each service station 15 will need a system of 1 kW, preferably 2 kW, indicatively, for producing power from renewable sources. According to an advantageous aspect of the present invention, as it will be better seen in the following, the reduced dimensions of the mobile devices allow to maintain reduced the power required for their operation.

According to a possible not limitative embodiment, the dimensions of the mobile devices 1 are selected so that to allow the transportation thereof on usual motor vehicles, and can be indicatively equal to 150 cm long, 150 cm wide and not over 90 kg heavy.

The present invention relates as well to a system comprising at least one mobile device 1 and at least one service station 15 of the above described type.

Advantageously the presence of a high number of mobile devices will allow to compress a greater area of glacier in a shorter time. The number of fixed stations 15 will be generally equal to the number of mobile devices in case each service station is able to connect to a single mobile device.

According to a possible embodiment three mobile devices 1 are employed which can be connected to as many service stations 15. It has to be noted that the example in which three mobile devices are used has not to be intended as limitative, in fact, according to possible embodiments a plurality of mobile devices can be provided, also of the order of hundreds of units, cooperating with one or more service stations, preferably with a service station for each mobile device.

Each service station 15 will be about 500 m far from the other two and the three mobile devices 1 will altogether compress (glacify) 180000 squared meters. This area will be mapped at the beginning of the season for verifying the heights every 10 squared meters: this will allow to evaluate the results after 9 months, that is to say at the end of the summer season.

According to a possible embodiment, herein reported by way of explanation and without limitation, each mobile device is designed to be moved on a 60000 squared meters surface at a speed of about 1.4 km/h and the battery will have such an uptime to allow a device run of 2.8 km on average, therefore covering 3000 squared meters between a recharge and the following in 2 hours, comprising the service paths. Therefore the whole working area of each mobile device will be covered in 20 steps, each one with about one hour for the recharge, thus the whole area will be glacified in 60 hours. At the end of the 60 hours, the process will start again from the beginning, to glacify the any snow precipitated meantime. The process will be however reiterated also without snow falls, since the continuous wind erodes the snowpack, even if glacified and therefore a second glacification would consolidate the first one. Supposing that the time available in six months is 4320 hours on the whole, and that the mobile device will have to be stopped only for 30% of the time for emergency conditions, the time available for the mobile devices is about 3000 hours and therefore the area will be glacified 50 times in a winter season, corresponding to twice the average amount of snow falls in a winter above 2500 m altitude. Knowing that each snow fall is 15 cm on average and that the compressed ice has an average thickness of 40% of the thickness of fresh snow, at the end of the season the year result of the action of the mobile devices according to the present invention will be a gain of 1.5 m of glacier height. Supposing that 50% of this can be melt during summer, the net glacier gain is about 70 cm; advantageously this will allow to come back in 15 years to the glacier extension preexisting 1960 according to the assessments carried out by the Applicant.

The present invention relates as well to a method for treating the snow covered surfaces, and in particular for preserving a glacier by means of the use of at least one mobile device 1 of the above described type comprising the step of moving the at least one mobile device on the surface of snow 5 in order to exert a compression force thereon and/or to vary the temperature of the surface of the snow 5.

As mentioned, the action of the compression force in combination or alternatively to the temperature variation of the surface of the snow 5, and preferably to the snow heating action, determines the adhesion of the settled fresh snow to the glacier substrate such as to prevent or at least hamper the wind erosion on said glacier.

It has to be noted that according to an aspect of the method of the present invention, the step of varying the temperature of the snow can be carried out also independently from the action of the compression thereof. According to a preferred aspect of the method according to the invention, the working path of the at least one mobile device will be predetermined and will be preferably composed of lines which will be basically parallel to contour lines, to allow the motor of the mobile device 1 to have better yield.

Of course, during the step in which the mobile device is moved on the surface of said glacier, the compressing means 3 are in operating position in contact with the surface of the snow 5 to exert a compression force thereon.

According to an aspect of the invention, the step of varying the temperature of the surface of the snow 5 provides for the heating or cooling of the snow surface.

Preferably, in the method according to the present invention, the step of surface heating of the snow is provided during the application of said compression force thereon by means of compressing means 3. Such an operation is carried out through the heating means 6 of the mobile device 1, such as for example one or more electrical resistances. Advantageously, by providing thermal energy on the surface of the snow during the compression, the formation of a crust on the upper surface of the snow is induced, allowing to further increase the resistance against the wind erosion.

The method can comprise as well the step of cooling the snow surface, through above described known means, which preferably is carried out without exerting a compression force on the snow surface, and preferably in the warm months to reduce the snow melting.

As already said above, the movement of said at least one mobile device 1 is preferably controlled through at least one service station 15 which is connected with the mobile device 1.

Referring to FIGS. 3-9 some steps of a possible embodiment of the method according to the present invention will be now described, in which a compression force is applied during the movement of the mobile device in combination with a surface heating action. Of course the steps of the method in which, according to possible embodiments only the variation of the snow surface temperature is carried out, will be similar to those described in the following except from the movement of the compressing means, which could also be not present.

Figure 3:
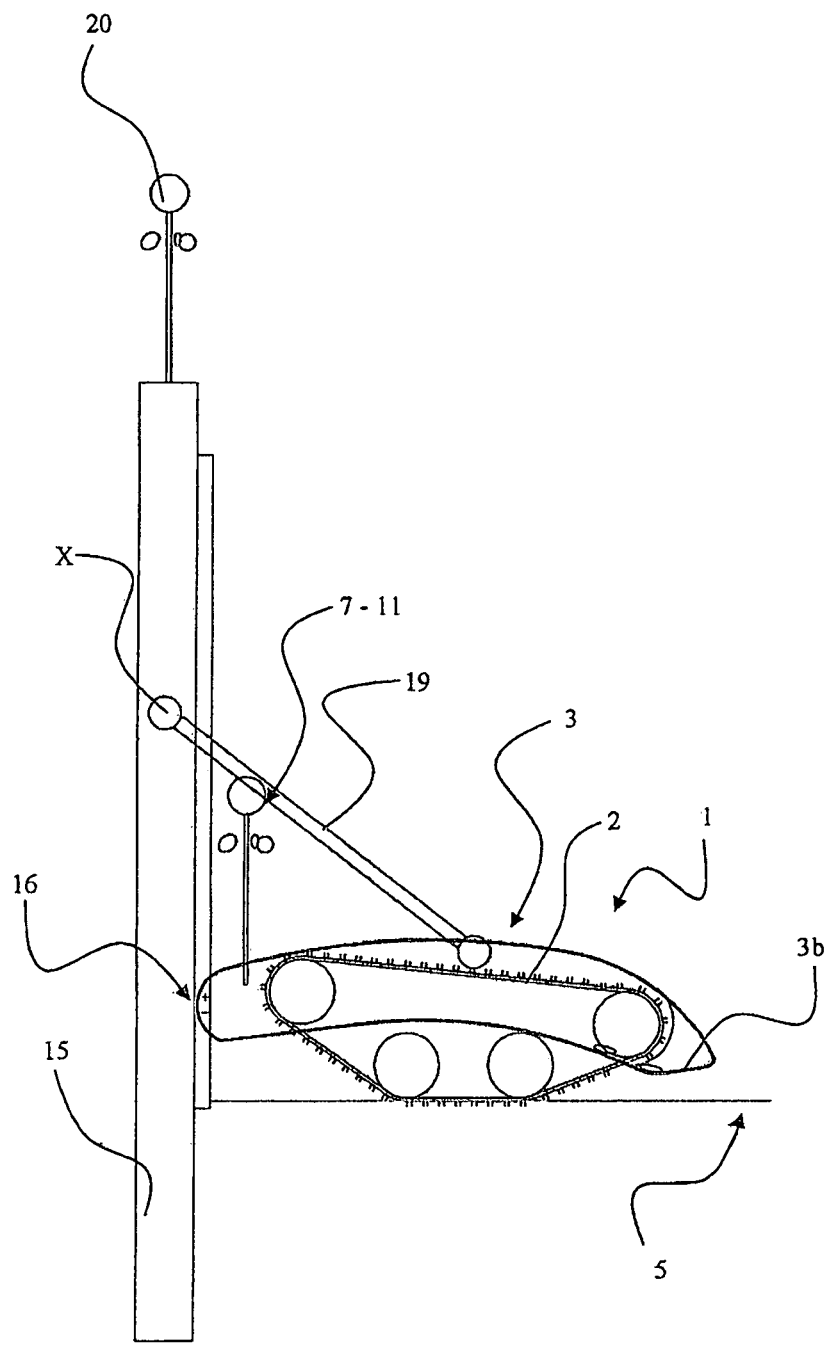
FIG. 3 is a side view of the mobile device in power supply position at a service station.

FIG. 3 is a side view of the mobile device 1 in a power supply position at a service station 15, the means 16 of the service station 15 to supply power to the mobile device are connected to the latter. The electric contacts 17 of the service station 15 are connected to relative electric contacts 18 of the mobile device 1, so as to transfer electric power from the first to the second one, so that to recharge the battery of the mobile device 1.

Furthermore, the means 19 for retaining in a stably position at least one mobile device 1, and in particular the pair of mobile arms, is arranged in a position engaging with the mobile device 1 so that to retain the latter in proximity of the service station 15.

Figure 4:
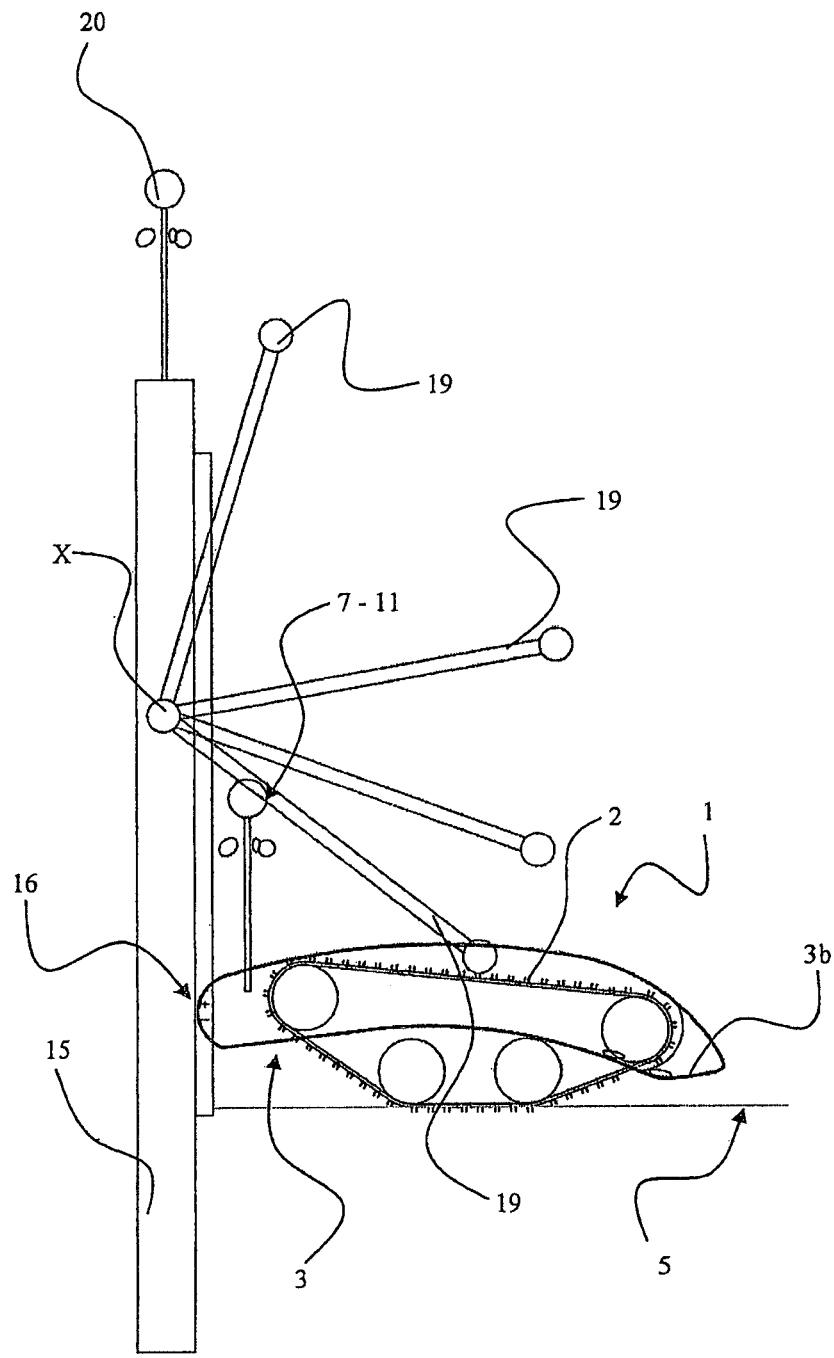
FIG. 4 is a side view in which the movement of the retaining means of the service station for the release of the mobile device according to the present invention is visible.

At the end of the charge of the at least one battery of the mobile device, and when the movement of the latter is desired to be started for the snow compression, the retaining means 19 of the service station 15 are moved for the release of the mobile device 1 (see FIG. 4).

More in detail, as visible in FIG. 4, the movable arms 19 are rotated upwards around the axis X so as to disengage the mobile device 1.

Afterwards the mobile device 1 is moved away from the service station 15 to start its path on the surface of the snow 5, upon the activation of the movement means 2.

Figure 5:
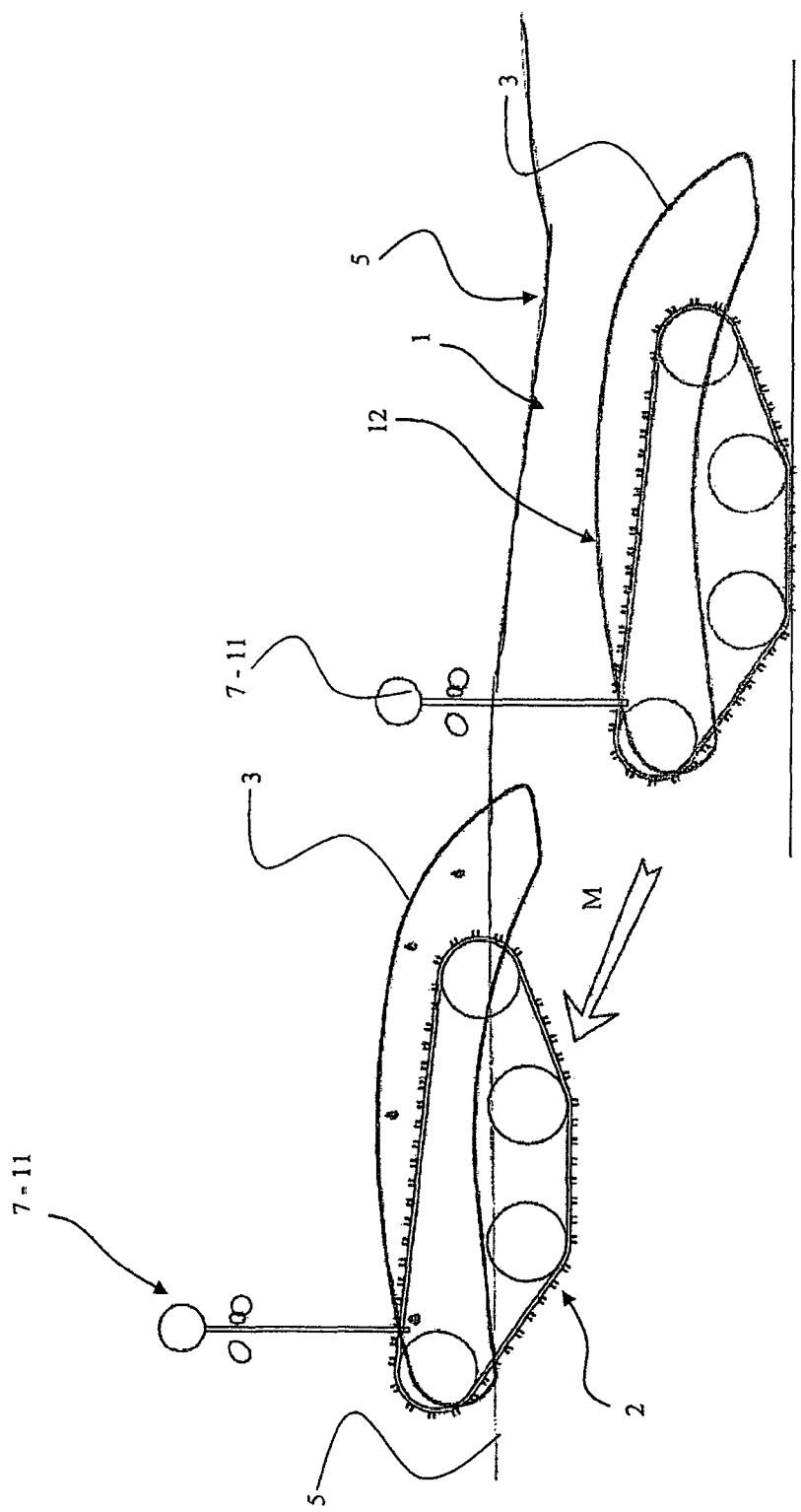
FIG. 5 is a side view in which the mobile device, emerging from the snow in case it has been covered during the supply at the service station, is visible.

FIG. 5 is a side view in which the mobile device is visible emerging from the snow in case it has been covered during the shelter, and/or the supply period at the service station 15. The emersion of the device 1 occurs upon its movement in the advance direction M.

Afterwards the mobile device 1 can be moved through the movement means 2 until reaching the position on the glacier beginning from which its movement has to start in the area wherein the snow has to be compressed.

When the snow is desired to be compressed during the advance motion of the mobile device 1 in the advance direction M, the compressing means 3 are activated to reach the operating position in which they, and in particular the at least one thrust surface 3b, are contacting the surface of the snow 5. During the movement of the mobile device 1 the means 6 for the variation of the snow temperature can be activated as well, and in particular the means 6 for heating of the surface thereof.

FIG. 6 is a side view of the mobile device according to the present invention in which the compressing means 3 are activated to reach the operating position in contact with the snow surface.

As mentioned above, in the embodiment shown in figures, the compressing means 3 can roto-translate with respect to the body 4 of the mobile device 1 so as to reach the operating position contacting the surface of the snow 5. The thrust generated by the thrust surface 3b is preferably equal to 2000 Pa so that to effectively carry out the compression of the fresh snow.

Preferably as mentioned, the compression force F exerted by the compressing means, and in particular by the thrust surface 3b, is directed substantially downwards, that is to say in a substantially perpendicular direction D with respect to the movement direction M of the mobile device on the surface of the snow 5.

As mentioned, the device will be moved along a predetermined path so that to cover a predetermined area of the glacier. During the season such an area along which the device is moved could be increased, since it could involve areas (adjacent or included in the original perimeter) not snow covered at the beginning of the season. In this way a surface increase of the glacier can be obtained, in addition to a thickness increase of the glacier.

During the movement of the mobile device 1 it can be called back and thus moved towards a service station 15, for example in case of emergency conditions, that is to say in determined environmental conditions which make the completion of the predetermined movement path impossible, or in case the mobile device has not enough uptime to terminate the preset path.

In other words, the method according to the present invention comprises the further step of moving the at least one mobile device 1 towards at least one service station 15, at least when said at least one mobile device operates in emergency conditions, said emergency conditions comprising, wind with speed higher than 50 km/h, preferably over 70 km/h, or in case of too much intense snow fall and that is to say with precipitations higher than 20 cm per hour, or in case of mechanical problems of the device, or insufficient uptime of the mobile device, or in case the presence of an obstacle is detected, or a combination of two or more of said emergency conditions.

In emergency conditions, the mobile device 1 will leave the working way moving towards a service station 15 through the shortest path.

According to an aspect of the present invention, during the movement towards the service station 15, the compressing means 3 are placed in a non-operating position for speeding up the reaching of the service station 15.

In other words, in the step of moving the at least one mobile device 1 towards the at least one service station 15, the compressing means 3 are arranged in at least one non-operating position in which the compressing means 3 are raised from the surface of the snow 5.

Figure 7:
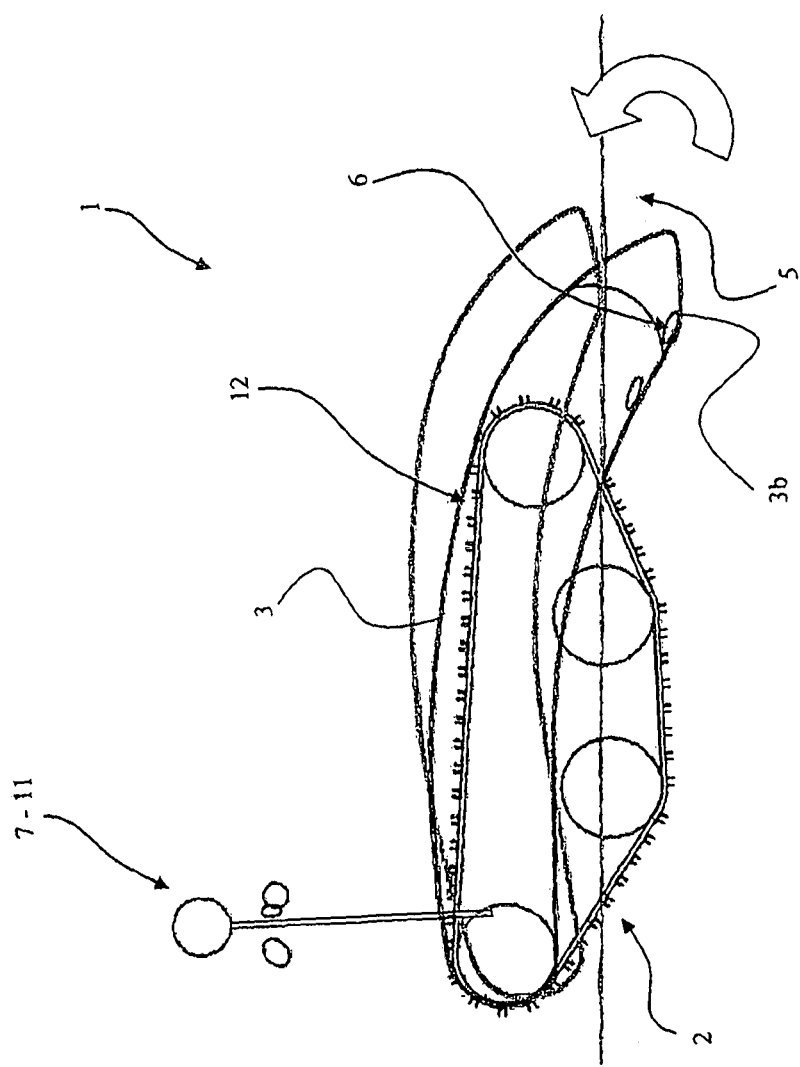
FIG. 7 is a side view of the mobile device according to the present invention in which the compressing means are operated to reach the non-operating position in which they are not contacting the snow surface.

FIG. 7 is a side view of the mobile device according to the present invention in which the compressing means 3 are operated to reach the non-operating position in which they are not contacting the snow surface. It has to be noted that at the end of the preset snow compression path the mobile device will be brought back to the service station 15 for the power supply, and in particular for the recharge of the batteries.

Figure 8:
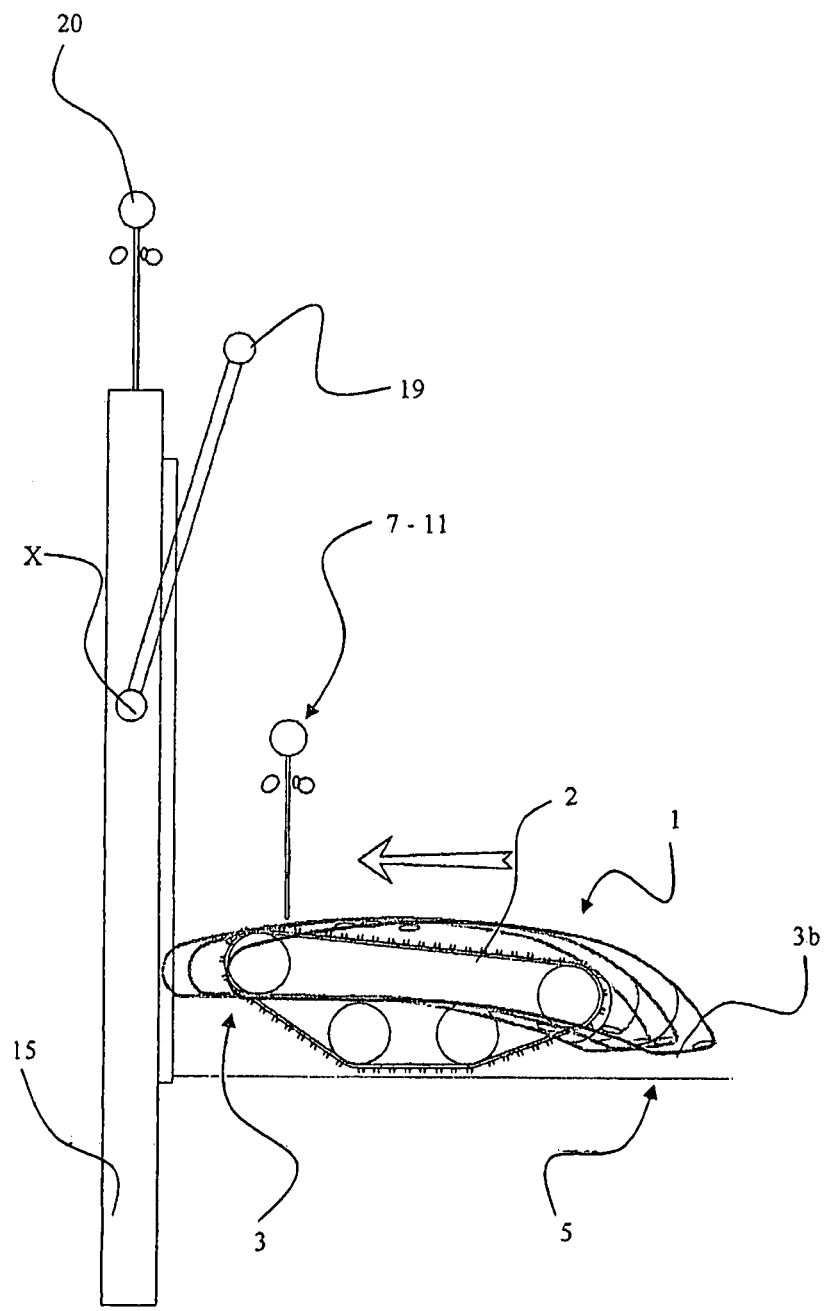
FIG. 8 is a side view in which the mobile device approaching the service station is visible.
Figure 9:
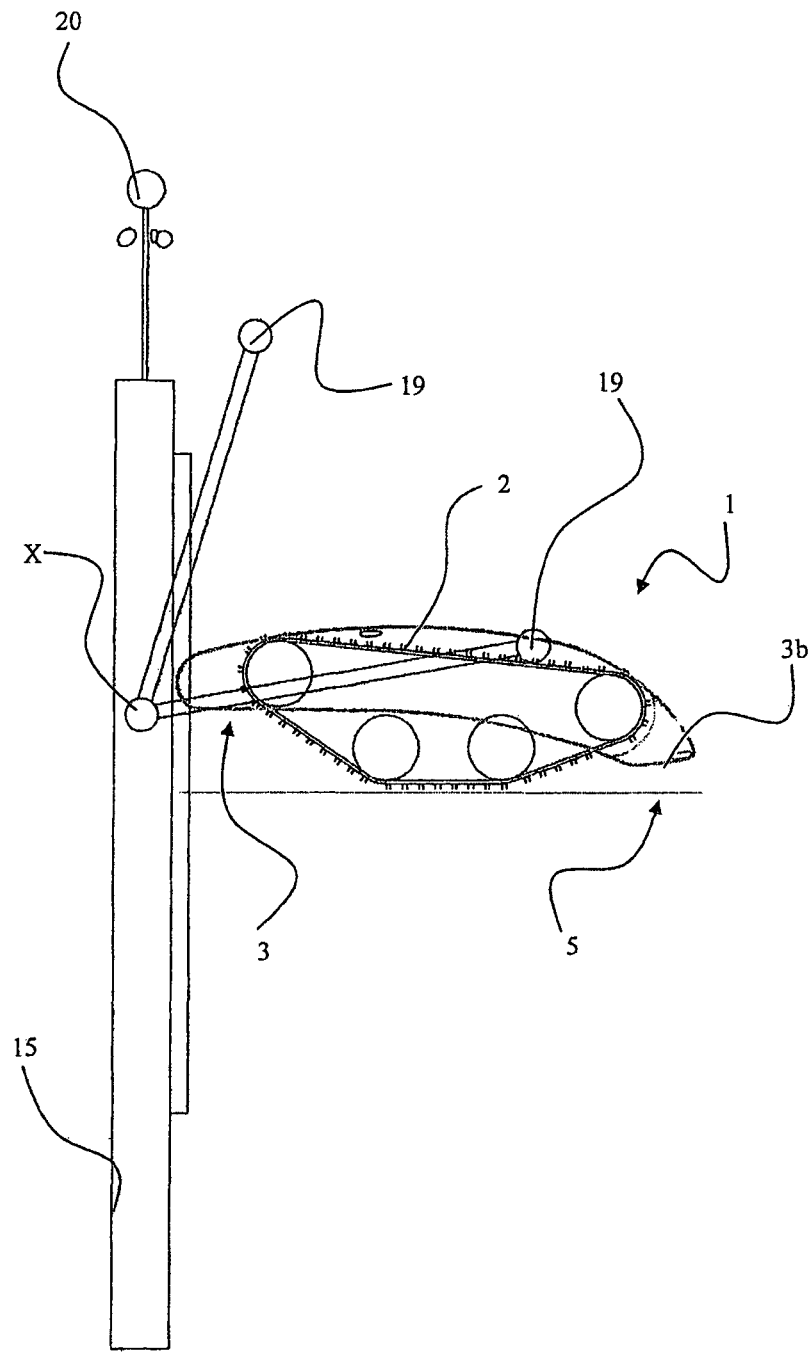
FIG. 9 is a side view wherein the movement of the retaining means of the service station for the stable retaining of the mobile device according to the present invention is visible.

On the other hand in FIG. 8 the mobile device 1 is visible approaching the service station 15. Once the mobile device 1 has reached the service station 15, as shown in FIG. 9, the retaining means 19 of the service station 15 are activated for stably retaining the mobile device 1.

At the end of the battery recharge, or when favorable environmental conditions get back, the at least one mobile device will be released, as described above from the service station 15 to carry on the movement with the concurrent compression of the snow along the preset way.

The invention claimed is:

1. An unmanned mobile device for treating a surface of snow or ice, comprising:
    transport means for transporting said unmanned mobile device over said surface;
    compressing means for compressing said snow or ice by exerting a compression force on said snow or ice to increase specific weight thereof; and
    temperature varying means for varying temperature of said surface.

2. The unmanned mobile device according to claim 1, wherein said unmanned mobile device includes an electric motor and said transport means include a track with teeth.

3. The unmanned mobile device according to claim 1, wherein said temperature varying means include cooling means for cooling said surface.

4. The unmanned mobile device according to claim 1, wherein said compressing means are slidably movable between at least one non-operating position in which said compressing means are raised above said surface, and at least an operating position in which said compressing means contact said surface to exert said compression force.

5. The unmanned mobile device according to claim 1, wherein said compressing means are capable of exerting a compression force higher than 1000 Pa, and comprise a thrust surface.

6. The unmanned mobile device according to claim 1, wherein said transport means comprise an electric motor powered by a battery or a fuel cell and further comprising data transmitting and receiving means for transmitting and receiving data.

7. The unmanned mobile device according to claim 1, further comprising identifying means for identifying a position of said unmanned mobile device.

8. The unmanned mobile device according to claim 7, wherein said identifying means comprise a device selected from the group consisting of a GPS sensor, a radio wave emitter, a receiver, an accelerometer and combinations thereof.

9. The unmanned mobile device according to claim 1, further comprising a sensor capable of detecting environmental conditions in which said mobile device operates, said sensor comprising at least one of a thermometer and an anemometer.

10. The unmanned mobile device according to claim 1, further comprising removing means for removing ice from a surface of said unmanned mobile device.

11. The unmanned mobile device according to claim 1, wherein said compressing means is adapted for varying said compression force exerted by said compressing means during said transporting of said unmanned mobile device.

12. The unmanned mobile device according to claim 11, further comprising removing means for removing ice from a surface of said unmanned mobile device, and wherein said transport means include an electric motor.

13. A system comprising a service station and an unmanned mobile device, said system comprising;
    said unmanned mobile device for treating a surface of snow or ice including means for transporting said unmanned mobile device over said surface, compressing means for compressing said snow or ice by exerting a compression force on said snow or ice to increase specific weight thereof, and temperature varying means for varying temperature of said surface; and
    said service station.

14. The system according to claim 13, wherein said service station is adapted to physically engage said unmanned mobile device and retain said unmanned mobile device in a stable position.

15. The system according to claim 14, wherein said service station comprises at least one rotatable arm adapted to physically engage said unmanned mobile device and retain said unmanned mobile device in said stable position.

16. The system according to claim 13, wherein said service station further comprises power supplying means for supplying power to said unmanned mobile device.

17. The system according to claim 16, wherein said service station further comprises data transmitting/receiving means for transmitting and receiving data to and from said unmanned mobile device, and
    said unmanned mobile device further comprises cooling means for cooling said surface.

18. A method for treating a surface of snow or ice, said method comprising:
    providing an unmanned mobile device for treating a surface of snow or ice, said unmanned mobile device comprising transport means for transporting said unmanned mobile device over said surface, compressing means for compressing said snow or ice by exerting a compression force on said snow or ice to increase specific weight thereof, and temperature varying means for varying temperature of said surface; and
    causing transport of said unmanned mobile device on said surface such that said unmannmed mobile device increases said specific weight of said snow or ice by at least one of exerting said compression force on said surface, and varying temperature of said surface.

19. The method according to claim 18, wherein said causing transport such that said unmannmed mobile device increases said specific weight of said snow or ice, includes said vaying said temperature of said surface.

20. The method according to claim 18, wherein said causing transport includes said unmanned mobile device exerting said compression force on said surface with said compressing means in an operating position and contacting said surface.

21. The method according to claim 18, further comprising causing said unmanned mobile device to move towards a service station and causing said unmanned mobile device to become physically engaged with said service station.

22. The method according to claim 21, wherein said compressing means are arranged in a non-operating position in which said compressing means are raised above said surface, when said unmanned mobile device moves towards said service station.

23. The method according to claim 18, wherein said causing transport comprises said unmannmed mobile device increasing said specific weight of said snow or ice by exerting said compression force on said surface, and further comprising varying said compression force during transport of said unmanned mobile device.

24. The method according to claim 18, wherein said unmanned mobile device further comprises removing means for removing ice from a surface of said unmanned mobile device and an electric motor, and further comprising removing ice from a surface of said unmanned mobile device using said removing means.

25. The method according to claim 18, wherein said unmanned mobile device includes a sensor for detection of environmental conditions, said sensor comprising at least one of a thermometer and an anemometer, and further comprising:

sensing environmental conditions using said sensor;

causing said unmanned mobile device to move towards a service station responsive to said sensor sensing emergency conditions, said emergency conditions including wind with speed equal to or higher than 50 km/h, mechanical problems of said unmanned mobile device and presence of an obstacle.

* * * * *